United States Patent Office 3,420,044
Patented Jan. 7, 1969

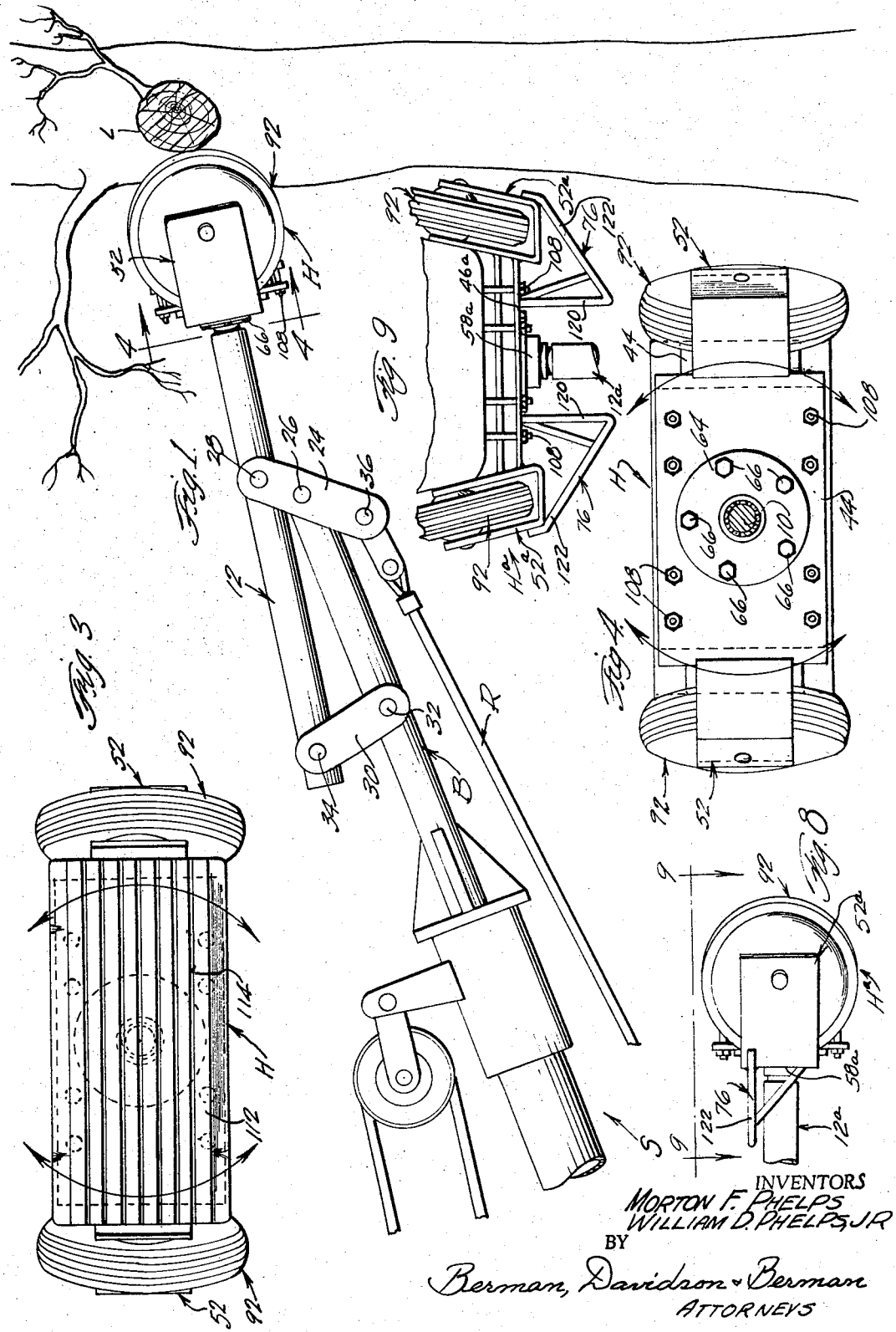

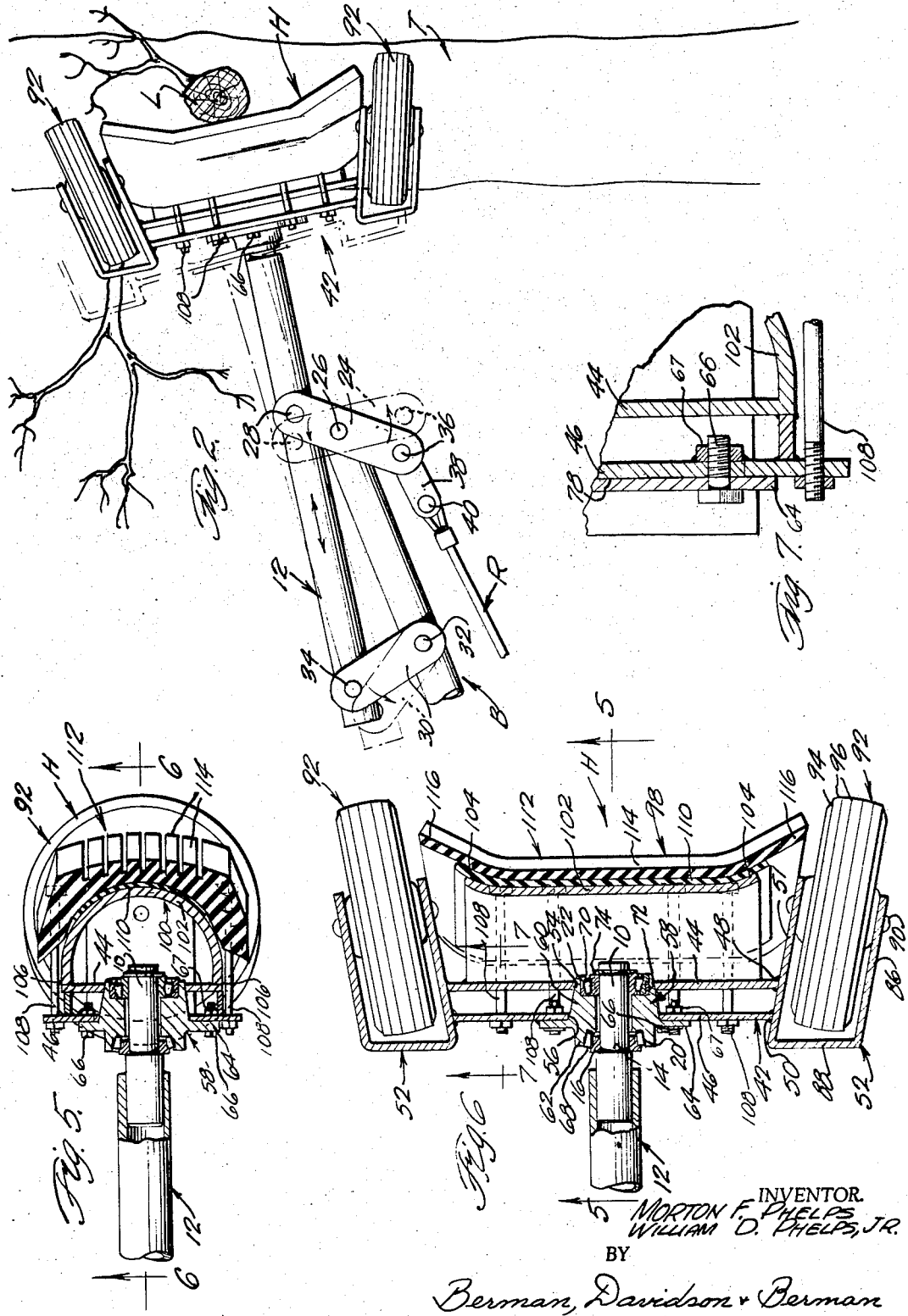

3,420,044
TREE SHAKER HEAD
Morton F. Phelps and William D. Phelps, Jr., both of
715 Thomas St., Little Rock, Ark. 72202
Filed Sept. 28, 1965, Ser. No. 490,788
U.S. Cl. 56—328    14 Claims
Int. Cl. A01g *19/00*

ABSTRACT OF THE DISCLOSURE

A shaker head apparatus, for use in a tree shaker of the type including a shaker machine having an extensible and steerable boom, a shaft extending along the boom and reaching forwardly therefrom, and means for longitudinally reciprocating the shaft relative to the boom, comprising an elongated rammer head, a swivel type bearing at the center of the head for journalling the head to the forward end of the shaft to freely rotate in a plane transverse to the axis of the shaft, and roller means at both ends of said head journalled for free rotation about the axis of said head and protruding slightly forward of the forward surface of the head. The construction of the rammer head is symmetrical so that normally the head is balanced to extend horizontally into engagement with a vertical tree trunk. When, however, the head is moved forward to engage a horizontal or inclined tree limb the roller means engages the limb first and automatically rotates the head into a vertical, or other plane at right angles to the tree limb engaged.

---

This invention relates to a tree shaker of the boom type, and more particularly to a rammer head therefor.

The primary object of the invention is the provision of a head of the kind indicated, which is self-adjusting to make full and secure contacts with tree trunks and tree limbs, regardless of their verticality or horizontality and positions in between, so that slippage of the head past the tree trunk or tree limb is eliminated, and full operative contact of the head therewith is assured and is maintained, during shaking operations.

Another object of the invention is the provision of a head of the character indicated above, which is freely rotatable on the axis of the boom on which the head is mounted, and is weighted to assume normally a horizontal position, so that, on the head's being reached by the boom into contact with a vertical tree trunk, the head operatively engages the tree trunk, in a horizontal position, wherein a concave saddle on the head makes a non-slip, crosswise engagement with such tree trunk; and so that, on the head's being reached by the boom to contact a horizontal tree limb, freely rotatable roller means, on opposite ends of the head, make initial contact with the limb and then rotate in opposite directions, so that the head is thereby rotated into a vertical position, wherein the saddle makes full and secure operative crosswise contact with the tree limb.

In the drawings:
FIGURE 1 is a schematic fragmentary side elevation, showing a head of the invention, mounted on a tree shaker machine and operatively applied to a vertical tree trunk;
FIGURE 2 is a view, like FIGURE 1, showing the head operatively applied to a horizontal tree limb;
FIGURE 3 is an enlarged front elevation of the head, per se;
FIGURE 4 is a vertical transverse section, taken on the line 4—4 of FIGURE 1;
FIGURE 5 is a transverse section, taken on the line 5—5 of FIGURE 6;
FIGURE 6 is a horizontal section, taken on the line 6—6 of FIGURE 5;
FIGURE 7 is a further enlarged fragmentary vertical transverse section, taken on the line 7—7 of FIGURE 6;
FIGURE 8 is a side elevation of another form of head; and,
FIGURE 9 is a fragmentary top plan view of FIGURE 8.

Referring in detail to the drawings, a shaker head H, of the present invention, is shown mounted on the forward end of the boom B of a tree shaker machine S, which can be similar to or an equivalent of the tree shaker disclosed in Patent No. 3,100,959, dated Aug. 20, 1963, to Morton E. Phelps.

The shaker head H is rotatably journalled on the reduced forward terminal 10 of a straight shaft 12, with which the terminal defines a shoulder 14, the terminal having fixed thereon a rear bearing race 16, engaged with the shoulder 14, and a forward bearing race 18, spaced forwardly from the rear race 16, these races being similarly recessed to accommodate tapered roller bearings 20 and 22, respectively, of the Timken type. The shaft 12 can be made up of facing welded channels, if desired.

The shaft 12 spacedly overlies and extends along the upper end portion of the boom B, and is supported on the boom, for forward and rearward reciprocation relative thereto, by means of a forward vertical lever 24 which is horizontally pivoted, intermediate its ends, as indicated at 26, on the upper end of the boom. The forward lever is pivoted, at its upper end, as indicated at 28, to the shaft 12, at a location forward of the midlength point of the shaft, and spaced from the terminal 10. A rear vertical lever 30 is pivoted, at its lower end, as indicated at 32, to the boom B, at the locations spaced rearwardly from the forward lever 24, and is pivoted, at its upper end, as indicated at 34, to the shaft 12, at a location near the rear end of this shaft. This arrangement disposes the levers 24 and 30 at upwardly divergent angles, relative to each other, and in the forwardly reached position of the shaft 12, and the head H, at acute angles relative to the boom B, as shown in FIGURE 1.

The lower end portion of the forward lever 24, which extends below the boom B, is pivoted, at its lower end, as indicated at 36, to a rearwardly extending link 38, to which rear end is pivotally secured, as indicated at 40, the forward end of a head reciprocating member R, such as the cable 182 of the tree shaker of the patent hereinabove mentioned. The reciprocating member R is adapted, upon forceable rearward movement thereof, to both the head H and the levers 24 and 30, from the phantom line positions, to the full lines position, as shown in FIGURE 2, for operatively engaging the head H, with a tree trunk or a tree limb; and is further adapted to then assume a slack condition, so as to enable the natural rebound of a tree trunk or tree limb thus forceably contacted and displaced by the head H, to push the head H back to a starting position. In the patent mentioned, provision for this slackening of the reciprocating member R is made by the operative incorporation in the assembly of which the cable 182 is a component, of a stretchable spring 210, which is stretched by the rebound of the head H.

The head H comprises a transversely elongated frame 42, composed of straight, vertical forward and rear flat bars 44 and 46, respectively, which are parallel spaced from each other, and, at their ends, are fixed, as indicated at 48 and 50, respectively, as by means of welding, to the inner arms 51 of wheel forks 52.

At their centers, the bars 44 and 46 are formed with aligned forward and rear openings 54 and 56, respectively, the rear opening 56 being larger in diameter than the forward opening 54. A hub 58 has a forwardly tapering forward portion 60 engaged in the openings 54 and 56, at a rearwardly extending rear portion 62 which extends rearwardly from the rear bar 46. The rear portion 62 is formed with a lateral flange 64 which is fixed to the rear side of the rear bar, as by means of bolts 66 extending through the bar 46 and threaded through nuts 67 welded to the forward side of the bar 46.

The hub 58 is formed with a rear annular groove 68, which confines the rear bearings 20 in the rear bearing race 16. The hub 58 is formed with a forward annular groove 70, in which is engaged an annular outer race 72, which is grooved, as indicated at 74, to confine the forward bearings 22 in the forward race 18.

The wheel forks 52, as clearly shown in FIGURE 6, are forwardly divergent with respect to each other, at small acute angles relative to the frame 42, the inner arms 51 of the forks extending forwardly from the frame and being parallel spaced relative to outer fork arms 86, these arms being connected, at their rear ends, by cross members 88, at locations behind the frame 42. Fixed axles 90 extend through the forward end portions of the fork arms and carry freely rotatable rollers or wheels 92, which reach forwardly beyond the forks 52. The wheels 92 have non-slip peripheries, preferably provided by pneumatic tires 94, having spaced circumferential ribs 96, for non-slip rolling contact with tree trunks and tree limbs.

Mounted to the frame 42 and extending between the rear forks 52, is a longitudinally concaved, tree engaging saddle 98. The saddle comprises an arcuate cross section member 100, having a convex forward wall 102, which, as shown in FIGURE 6, terminates, at its ends, in forwardly and outwardly angled end portions 104. The rear edges of the cross member 100 are fixed, as indicated at 106, as by means of weldings, to the forward side of the forward frame bar 44, at locations adjacent to the upper and lower edges of the bar 44. Bolts 108 traverse the plate 44 and secure the shoe 112 thereto.

Suitably affixed to the forward surface of the cross member 100 and conforming in contour thereto, and reaching beyond the ends thereof, is a cushion backing plate 110, of such as neoprene. Suitably affixed to the forward surface of the cushion plate 110 is a compressible and resilient shoe 112, of rubber tire material, which conformably engages the plate, as shown in FIGURE 5. The shoe 112 is of relatively great thickness, as compared to the cushion plate 110, and preferably has the cross section of a vehicle tire tread, including laterally spaced longitudinal tread ribs, 114, for non-injurious, and non-slip contact with tree trunks and tree limbs. As shown in FIGURE 6, the shoe 112 has forwardly and outwardly angled end portions 116, which reach outwardly beyond the ends of the cushion plate 110. The end portions 116 serve to act as cams, when pushed against a tree trunk or a tree limb, whereby the head H is moved endwise, along with the boom B so that full-fledged operating contact of the main central part of the shoe 112 is obtained, for a shaking operation.

In FIGURES 8 and 9, a modified form of Head H$^a$ is shown, which is similar to the head H of FIGURES 1 to 7, except that tree limb guards 76 are applied to the rear of the head H$^a$.

The tree limb guards 76 comprise open V-shaped forms having base members 120 disposed parallel to and spaced at equal distances from the hub 58$^a$ and the shaft 12$^a$, the base members 120 being fixed, as by means of welding, to the bar 46$^a$. The members 120 merge, at their rear ends, into forwardly and outwardly angled members 122 which are fixed, as by welding, to the outer sides of the outer arms of the wheel forks 52$^a$.

As shown in FIGURE 8, the tree guard members 120 and 122 are together located in a horizontal plane which is slightly spaced above the hub 58$^a$, and these members are braced in position, by means of diagonal braces 124 which are fixed, as by welding, at their depressed forward ends, to the bar 46$^a$, at parts spaced below and in line with the forward ends of the members 120. The bases 124 extend at upwardly and laterally outward angles, and are fixed, as by welding, to the tree guard members 122, at points near to and spaced laterally outwardly from the members 120. The outer angled members 122 of the tree limb guards 76 serve to cam away from the shaft 12$^a$, any tree limbs which would otherwise interfere with the operation of the shaft 12$^a$ and the head H$^a$, and be injured by such contacts.

In use and operation, the head H is reached to a tree trunk T or a tree limb L by moving the supporting shaking machine, and by extending and directing the boom B. Initially, the head H, is in a horizontal position, and it approaches and engages a tree trunk T, as shown in FIGURE 1, so that if the head is accurately directed, the shoe 112 of the saddle 98, correctly and operatively engages the tree trunk T, for a tree shaking operation, performed for the purpose of shaking a nut or other crop from the tree, by operating and supporting machine to reciprocate the head H.

In the event that a tree limb L, rather than a tree trunk T is to be shaken, the head H is directed, in a horizontal position, to the limb L, so that one or both of the wheels 92 make contact with the limb, in advance of the shoe 112. The usual tree limb being disposed at an angle to the horizontal, one wheel 92 will contact the upper area of the limb or the other wheel 92 the lower area thereof, and roll thereagainst. This automatically produces rotation of the head H, from a horizontal position, to a vertical position, as shown in FIGURE 2, so that the shoe can make full operative contact with the tree limb L. The machine is then operated to reciprocate the head H.

The operation of the supporting machine, in either case, produces reciprocation of the head H, through endwise movements of the reciprocating member R, with the result that the tree trunk or the tree limb has imparted thereto, an effective oscillatory motion, composed of the forward and rearward thrusts of the head, and limited upward and downward motions, of the head, as the head carrying shaft 12 is moved upwardly and downwardly relative to the boom B, by the action of the levers 24, and 30.

What is claimed is:

1. A shaker head assembly for use in a tree shaker of the type including a shaker machine having an extensible and dirigible boom, a shaft extending along the boom and reaching forwardly from the boom, and means for longitudinally reciprocating said shaft relative to the boom, the improvements comprising an elongated rammer head, swivel type bearing means at the center of the head for journalling the head to the forward end of the shaft for free rotation in a plane transverse to the axis of the shaft, and roller means at both ends of said head journalled for free rotation about the axis of said head and protruding slightly forwardly of the forward surface of said head.

2. A shaker head assembly according to claim 1 wherein said head including said roller means is symmetrically formed to provide substantially the same weight on opposite sides of said swivel type bearing means, whereby said head when not engaged with a tree part is normally balanced to lie in a substantially horizontal position.

3. A shaker head assembly according to claim 2 wherein said head comprises a saddle, said roller means comprising wheels, said wheels being in forwardly divergent relationship to each other and having their peripheries extended forwardly beyond said saddle for contact with a tree limb in advance of the saddle.

4. A shaker head assembly according to claim 2 wherein said rammer head comprises an elongated frame extending transversely of said shaft, and a shoe extending along and fixed to the forward side of the frame, said shoe having a non-slip forward surface.

5. A shaker head assembly according to claim 4 wherein said non-slip forward surface of said shoe is convex and formed with vertically spaced, longitudinal non-slip ribs.

6. A shaker head assembly according to claim 5 wherein said shoe is formed of a compressible and resilient material.

7. A shaker head assembly according to claim 2 wherein said rammer head comprises an elongated frame extending transversely of said shaft, a rigid cross-member fixed to the forward side of the frame, said cross-member having a horizontally concave arcuate forward wall with a vertically convex forward surface, and a shoe having a rear portion conforming in contour to and fixed to the convex surface of the cross-member, said shoe having a non-slip forward surface.

8. A shaker head assembly according to claim 7 wherein the forward wall of said cross-member terminates at its ends in forwardly and outwardly angled end portions overlaid by said shoe, the ends of the shoe extending beyond the ends of the cross-member.

9. A shaker head assembly according to claim 2 wherein said rammer head comprises an elongated frame extending transversely of said shaft, a shoe extending along and fixed to the forward side of the frame, said shoe having a non-slip forward surface, forwardly divergent wheel forks fixed on the ends of the frame, and wheels constituting said roller means journalled in the forks and reaching forwardly beyond the shoe.

10. A shaker head assembly according to claim 9 wherein there is additionally provided tree limb guard means on the rear of said frame at opposite sides of the shaft.

11. A shaker head assembly according to claim 10 wherein said limb guard means comprise a pair of similarly shaped and sized frame assemblies disposed equidistant from said swivel type bearing means and thereby constituting balancing weight means shaped to normally maintain said rammer head horizontal.

12. A shaker head assembly according to claim 10 wherein said wheels have resilient and compressible non-slip peripheries.

13. A tree shaker assembly according to claim 11 wherein said rammer head comprises a frame having a rear transverse bar to which the limb guard means are fixed, the rear bar extending above and below the shaft, said limb guard means comprising individual tree guards fixed to the rear bar at points spaced above the shaft.

14. A tree shaker assembly according to claim 13 wherein said individual tree guards comprise longitudinal members spaced from and parallel to the shaft and fixed at their forward ends to said rear transverse bar on the frame, said longitudinal members merging at their rear ends into forwardly and laterally outwardly angled members, said angled members being fixed at their forward ends to the outer sides of the head, and braces extending between the rear bar at points below the shaft to the angled members.

References Cited

UNITED STATES PATENTS

| | | | |
|---|---|---|---|
| 2,690,639 | 10/1954 | Goodwin | 56—328 |
| 2,891,372 | 6/1959 | Goodwin | 56—328 |
| 2,925,701 | 2/1960 | Fitzgerald | 56—336 |
| 3,013,374 | 12/1961 | Balsbaugh | 56—328 |
| 3,084,967 | 4/1963 | Harrett | 294—86 |
| 3,100,959 | 8/1963 | Phelps | 56—328 |

ABRAHAM G. STONE, *Primary Examiner.*

PASQUALE A. RAZZANO, *Assistant Examiner.*